United States Patent [19]
Kondo et al.

[11] Patent Number: 5,713,021
[45] Date of Patent: Jan. 27, 1998

[54] MULTIMEDIA DATA SEARCH SYSTEM THAT SEARCHES FOR A PORTION OF MULTIMEDIA DATA USING OBJECTS CORRESPONDING TO THE PORTION OF MULTIMEDIA DATA

[75] Inventors: Akiko Kondo; Koki Kato; Hiroshi Ishikawa, all of Kanagawa, Japan

[73] Assignee: Fujitsu Limited, Kawasaki, Japan

[21] Appl. No.: 528,041

[22] Filed: Sep. 14, 1995

[30] Foreign Application Priority Data

Jun. 28, 1995 [JP] Japan .................... 7-161712

[51] Int. Cl.$^6$ ........................ G06F 17/30
[52] U.S. Cl. .............. 395/614; 395/615; 395/806; 395/328
[58] Field of Search .................. 395/614, 615, 395/806, 807, 328; 364/514 R, 514 A

[56] References Cited

U.S. PATENT DOCUMENTS

| | | | |
|---|---|---|---|
| 5,521,841 | 5/1996 | Arman et al. | 364/514 A |
| 5,557,785 | 9/1996 | Lacquit et al. | 395/615 |
| 5,613,032 | 3/1997 | Cruz et al. | 386/69 |

OTHER PUBLICATIONS

V. Venugopal, "Issues in the Design and Implementation of Viens in Object-Oriented Databases," 1990 Int'l Phoenix Conference on Computers and Communications, p. 903.

Terubiko Teraoka et al. "The MP-tree: A Data Structure for Spatio-Temporal Data," Proceedings of 1995 IEEE 14th Int'l Phoenix Conference on Computers and Communications, Mar. 1995, pp. 326-333.

Young Francis Day et al, "Object-Oriented Conceptual Modeling of Video Data," 1995 11th Int'l Conference on Data Engineering, pp. 401-408.

S. Christodoulakis et al., "The Multimedia Object Presentation Manager of MINOS: A Symmetric Approach," ACM Proceedings of SIGMOD 1986, pp. 295-310.

Proc. IPSU National Conference, Fujitsu Australia Limited; Published Sep. 1994; Kondo et al. "Experimental Multimedia Information Management System Using Object-Oriented Database" with attached partial English Translation (circled portion).

*Primary Examiner*—Paul V. Kulik
*Attorney, Agent, or Firm*—Armstrong, Westerman, Hattori, McLeland & Naughton

[57] ABSTRACT

A multimedia data search system, includes a storage unit for storing features of a portion of data and data identifying the portion of data, a search unit for searching view objects stored in the storage unit according to a feature of the portion of data, and a display/reproduction unit for displaying and reproducing a portion of data corresponding to a searched view object, or multimedia data including the portion of the data. The system implemented with this invention facilitates searching for a portion of sequential data, and displays neighboring data depending on a requirement when displaying the portion of data.

24 Claims, 22 Drawing Sheets

```
ATTRIBUTE
    TYPE OF MEDIUM    TEXT
    FILE NAME         xxx
    PORTION           a-b
    KEYWORD           xxx
METHOD
    DISPLAY ( )
```

FIG. 5

```
ATTRIBUTE
    TYPE OF MEDIUM     IMAGE
    FILE NAME          x x x
    PORTION            (x1, y1)-(x2, y2)
    KEYWORD            x x x
METHOD
    DISPLAY ( )
```

FIG. 6

```
ATTRIBUTE
    TYPE OF MEDIUM    AUDIO
    FILE NAME         xxx
    PORTION           t1-t2
    KEYWORD           xxx
METHOD
    PLAY ( )
```

FIG. 7

ATTRIBUTE
    TYPE OF MEDIUM    VIDEO
    FILE NAME         x x x
    PORTION           {(t1, (x11, y11)-(x12, y12),
                      t2, (x21, y21)-(x22, y22),
                      ...
                      tn, (xn1, yn1)-(xn2, yn2)}
    KEYWORD           x x x
METHOD
    PLAY( )

FIG. 8

```
RESULT
   KEYWORD     : XXX
   VIDEO         12    400sec
   AUDIO          3    120sec
   IMAGE          5
   TEXT          32
```

FIG. 13

```
ATTRIBUTE
    SET  [TYPE OF MEDIUM
             SET VIEW OBJECT]
    KEYWORD
METHOD
    REPRESENT ( )
```

FIG. 16

MULTIMEDIA DATA SEARCH SYSTEM THAT SEARCHES FOR A PORTION OF MULTIMEDIA DATA USING OBJECTS CORRESPONDING TO THE PORTION OF MULTIMEDIA DATA

BACKGROUND OF THE INVENTION

1. Field of the Invention

The present invention relates to a multimedia data search method. Particularly, this invention relates to a multimedia database system that searches for a portion of multimedia data using view objects corresponding to the portion of multimedia data, and represent the searched data efficiently using the feature of multimedia data.

2. Description of the Related Art

The multimedia database system that handles a variety of data types such as text data, audio data, still image data, video data, etc. has been developing rapidly in recent years. As multimedia data features, a huge amount of data, a variety of data types, etc. can be cited. Therefore, there are demands that only needed information be easily retrieved from a huge amount of data, and that a method allows users to search data from their requirement. Further, when new data types are added, a feature to properly cope with the added data type is needed.

Since a multimedia database system utilizes a huge amount of data, it requires a method for properly storing retrieved data information to be reused. For use of a portion of data, particularly for a portion of sequential data, it is also required to identify the relative temporal and/or spatial location with other data.

Conventional database search systems adopt a search method mainly using a keyword. The search using the keyword, however, cannot access data located in the middle of sequential data. Also the keyword and other attributes are specific to the entire data. Retrieved data can be reused only when they can be saved after they are edited. There is no search method specifically designed to display data located in the middle of sequential data.

Since searching multimedia data generates a huge amount of data, it is hard to refer to the resultant data. Therefore, data searches using limited patterns only are available for all the users. If new data types are added, the system needs to be reconfigured. Additionally, the total amount of data further increases as the data are copied, edited and saved. If any modification is made to the original data, the information obtained by editing the original data cannot be propagated to the edited data automatically. Additionally, it is impossible to find a location of a portion of data located in the middle of sequential data.

SUMMARY OF THE INVENTION

A first object of this invention is to provide a database search system that facilitates searching a portion of sequential data using a variety of search patterns depending on user's viewpoint. The second object of this invention is to provide the system a function of storing a procedure for displaying complex object data. A third object of this invention is to allow the system to display the searched portion of data and its neighbor.

According to the present invention, a portion of multimedia data is pointed by specifying time or a space information as a view object. By specifying the view object, the portion of data corresponding to that view object is retrieved to display as a portion of multimedia data. Thus, a portion of data, i.e. a portion of sequential data, can easily be retrieved to allow users to search data depending on their requirement. Even if different data types are added, a multimedia data search system can be flexibly expanded. Additionally, by supporting a complex view object, a variety of view objects that are meaningful to the users can be handled as a set, or be divided into groups in a more abstract manner by the users.

Using the complex view object allows the view objects to be reused, which semi-automates data editing. To implement a feature to display neighboring data in addition to a portion of data with limited space, the present invention gets sampled (rough) information from neighboring data.

As described above, the present invention greatly contributes to the implementation of a search system that can efficiently use the features of multimedia data.

BRIEF DESCRIPTION OF THE DRAWINGS

FIG. 5 shows an example of a text view object;

FIG. 6 shows an example of an image view object;

FIG. 7 shows an example of an audio view object;

FIG. 8 shows an example of a video view object;

FIG. 13 shows an example of a display of search results;

FIG. 16 shows an example of a complex view object;

DESCRIPTION OF THE PREFERRED EMBODIMENT

Figure 1:
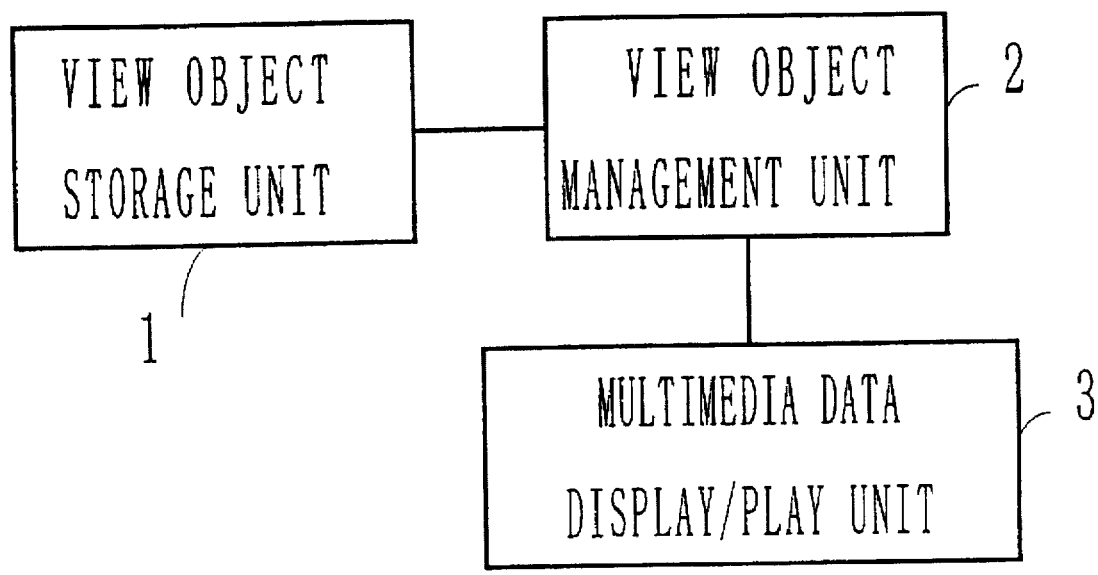
FIG. 1 is a block diagram showing a principle of the present invention.

Explanation on the multimedia data search system is hereafter provided using an embodiment of the present invention. FIG. 1 is a block diagram showing a configuration of the multimedia data search system that searches for data in a multimedia database holding multimedia data.

Figure 2:
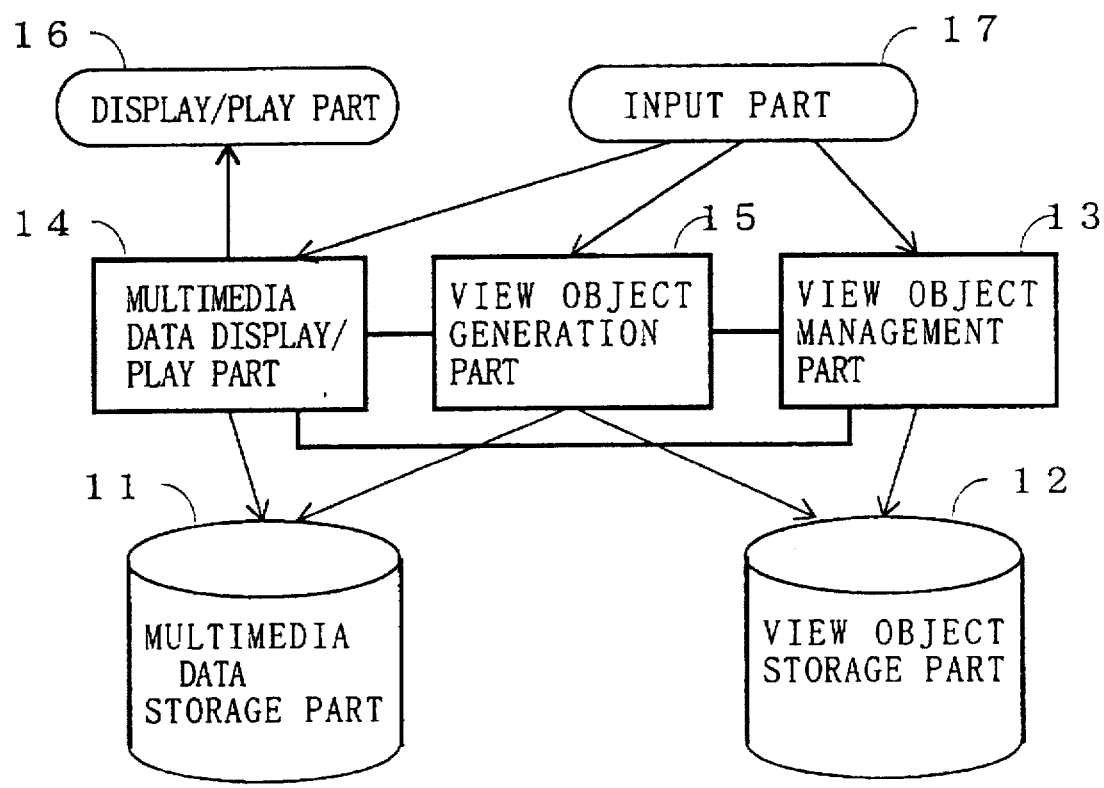
FIG. 2 shows a block diagram for a basic configuration of the multimedia data search system.

In this figure, a view object storage part 1 is, for example, a view object storage part 12 shown in FIG. 2. It is intended to store a view object that describes features of a portion of data by specifying a period of time and/or a range of space, such as a keyword and data that identifies the portion of data, data that identifies the range of a portion of data in a file, for example, a range from the n-th byte to the m-th byte, counted from the beginning of a file, in text data, for example.

Accordingly, a view object is generated for each portion of data depending on a keyword. The generated view object is stored in the view object storage part 1.

A view object management part 2 is, for example, a view object management part 13 shown in FIG. 2. It is intended to search view objects stored in the view object storage part 1 according to a specification of features such as a keyword, etc. made by a user.

A multimedia data display/reproduction part 3 is, for example, a multimedia data display/reproduction part 14 shown in FIG. 2. It is intended to display and play either a portion of data corresponding to a view object searched by the view object management part 2, or multimedia data including the portion of data. A portion of data such as a still image, i.e. a portion of image data visible on a screen, corresponds to a keyword. A view object that describes the keyword and information indicating the portion of data is generated by, for example, a view object generation part 15 shown in FIG. 2., and stored in a view object storage part 12.

The view object storage part 1 stores view objects corresponding to a variety of data such as text data, image data, audio data, video data, etc. for each medium. Then, the view object management part 2 searches for corresponding view objects from the contents of the view object storage part 1 by specifying features of the portion of data such as a keyword, etc., by a user. According to this invention, such view objects are managed by an object-oriented database, and stored and managed independently from the multimedia data itself.

A multimedia data display/reproduction part 3 displays the portion of data corresponding to the view objects searched from the contents of the view object storage part 1 by the view object management part 2, by invoking a method "display ( )" or "play ( )" defined, for example, in a view object.

When the portion of data is displayed, the video data, for example, neighboring data, can be displayed in addition to the data corresponding to the view object. For image data, for example, not only a portion specified on a screen, but other portions of data can be reduced to be displayed.

According to this invention as described above, a portion of data can be represented from entire data by using a view object a view object.

FIG. 2 is a block diagram showing a basic configuration of the multimedia data search system of the present invention. In this figure, a multimedia data storage part 11 stores multimedia data such as text data, image data, audio data, video data, etc. A view object storage part 12 stores view objects describing user-specific information such as a keyword and information identifying a portion of multimedia data.

A view object management part 13 searches view objects stored in the view object storage part 12. A multimedia data display/reproduction part 14 retrieves required data from the contents of the multimedia data storage part 11 according to view objects searched by the view object management part 13, and displays/plays the portion of data as described in view object for each medium in an appropriate way on a display part 16. A view object generation part 15 generates a new object by referencing corresponding multimedia data stored in the multimedia data storage part 11 and converting it into required data when a user inputs the information on a portion of data, i.e., a keyword and information identifying the portion of data via an input part 17.

Figure 3:
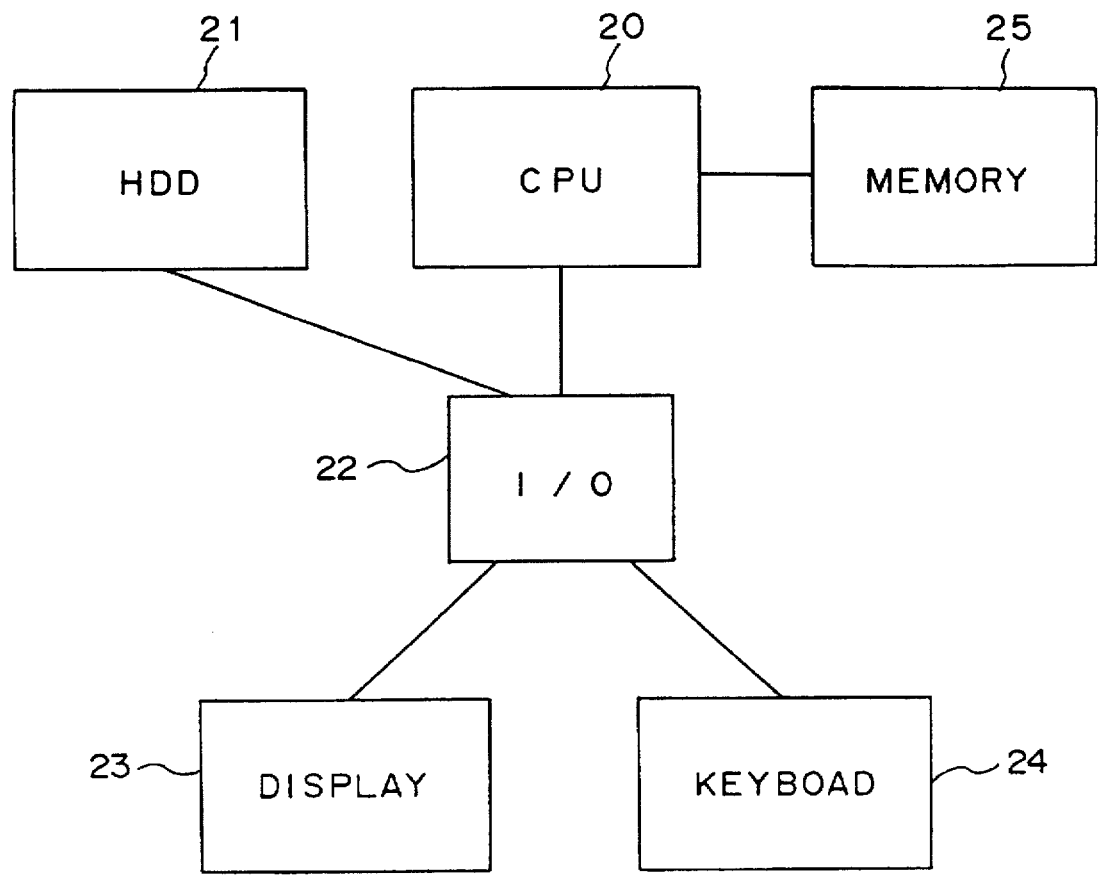
FIG. 3 shows a block diagram of a computer environment for a system configuration that implements a basic system shown in FIG. 2.

FIG. 3 shows an environment for a computer system to implement the basic configuration shown in FIG. 2.

This figure shows a general-purpose configuration of a computer system. A CPU 20 is an implementation of the view object management part 13, the multimedia data display/reproduction part 14, and the view object generation part 15 shown in FIG. 2. A hard disk drive (HDD) 21 is an implementation of the multimedia data storage part 11 and the view object storage part 12.

A display unit 23 is an implementation of the display part 16. A keyboard 24 is an implementation of the input part 17.

Figure 4:
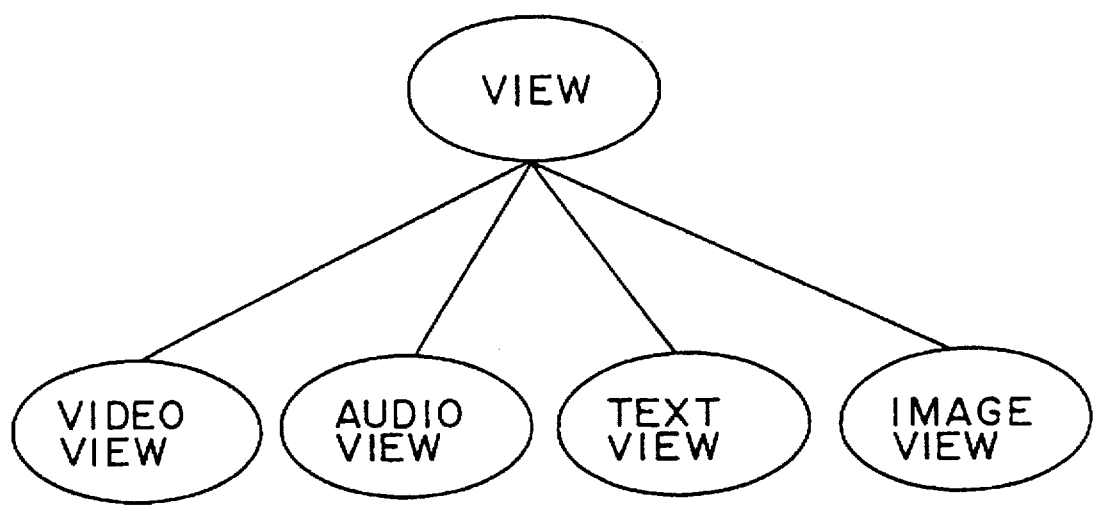
FIG. 4 shows an explanatory views of a class structure of view objects in this embodiment.

FIG. 4 illustrates a class structure of a view object according to an embodiment of this invention. The view object is managed by an object-oriented database constructing such a class structure. Features of such an object-oriented database are described below.

For multimedia data, there are problems such as the uniformity of different media and handling of a large amount of data. The object-oriented database can uniformly handle different data types as objects, which is suitable for the multimedia database. Additionally, adopting polymorphism allows the same method to be used regardless of media or format. If data in a different format is added, it is only required to set a new view object class. That is, this method can flexibly be expanded to include the data in a different format. A display/play procedure of the multimedia data generally depends on a medium type. By invoking a method "display( )" or "play" defined in a view object, a display/play procedure suitable for the data format of that medium is executed.

FIGS. 5–8 show examples of the view objects that respectively correspond to media such as a text medium, an image medium, an audio medium, and a video medium. These view objects are generated by invoking a method "new( )" provided by the system. This method is a procedure to newly generate an object that has a class structure when the method is invoked. If attribute values are specified as arguments, the specified values are recognized as the attribute values, when the attribute values are not specified, an object with default values is generated.

Next, how these view objects are generated is described in the following steps (1) through (4).

(1) Generating a text view object

A user selects a desired portion of text data visible on a screen for registration (by dragging a mouse or by marking with a tablet), and inputs a keyword (via a keyboard or by selecting from a menu where it has been previously registered.)

The view object generation part 15 converts starting and end locations of the selected portion in a file into the numbers of bytes counted from the beginning of the file (by using a feature provided by the windows operating system). Then, it invokes a method "new( )" provided by the system in a text view class to generate a text view object using the numbers of bytes, a file name, and the above keyword as arguments. For example, assume that the number of bytes of the starting location in the selected portion from the beginning of the file is a, and the number of bytes of the end location in the selected portion from the beginning of the file is b. In this case, the text view object shown in FIG. 5 is generated.

(2) Generating an image view object

A user selects a desired portion of image data visible on a screen for registration (by dragging a mouse or by marking with a tablet, etc.), and inputs a keyword (via a keyboard or by selecting from a menu where it has been previously registered).

The view object generation part 15 reads an upper-left coordinate and a lower-right coordinate (an upper-left coordinate of an entire image is recognized to be (0,0)) in the selected rectangle using a feature provided by the windows operating system. A method "new( )" provided by the system is invoked in an image view class using the coordinates, a file name and the above keyword as arguments in order to generate an image view object. Assuming the upper-left and lower-right coordinates in the selected portion are, for example, (x1,y1) and (x2,y2) respectively, the image view object shown in FIG. 6 is generated.

(3) Generating an audio view object

Figure 9:
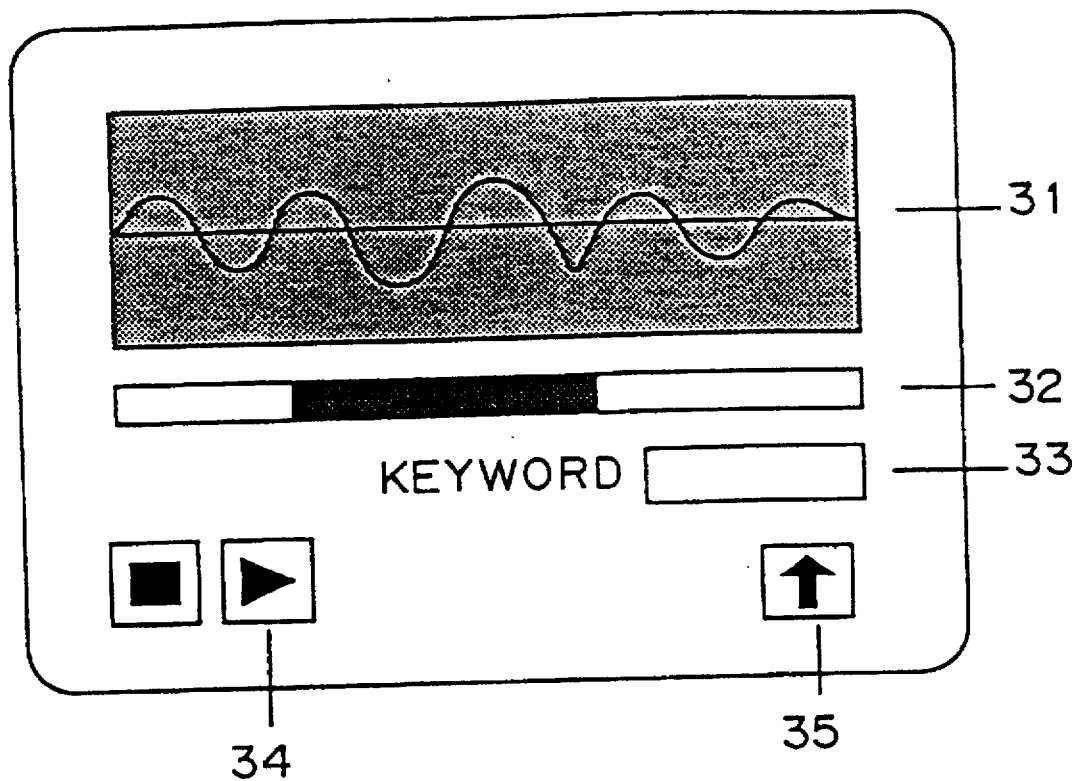
FIG. 9 shows how to set the audio view object.

First of all, a user plays audio data by pressing a playback button 34 on an input screen of a GUI (Graphic User Interface) shown in FIG. 9. Then, the user selects the desired portion of the data for registration by pressing a button 35 to set a portion of data visible on the screen from the first and last timings of the desired portion, or by dragging a bar 32 for selecting a portion of the data with a mouse etc. in reference to a waveform in a voice waveform window 31 displayed simultaneously with sound reproduction via a speaker. Then, the user inputs a keyword (via a keyboard or by selecting from a menu where it has been previously registered). The keyword is displayed in a keyword window 33.

The view object generation part 15 reads the first and the last portions selected using one of the features provided by the window's operating system, and converts them into the number of seconds starting from the beginning of a file. Then, it invokes a method "new( )" provided by the system in an audio view class using the number of seconds, the file name, and the above keyword as arguments, in order to generate an audio view object.

Assuming that the number of seconds of the first timing in the selected portion from the beginning of the file is t1, and the number of seconds of the last timing in the selected portion from the beginning of the file is t2, the audio view object shown in FIG. 7 is generated.

(4) Generating a video view object

Figure 10:
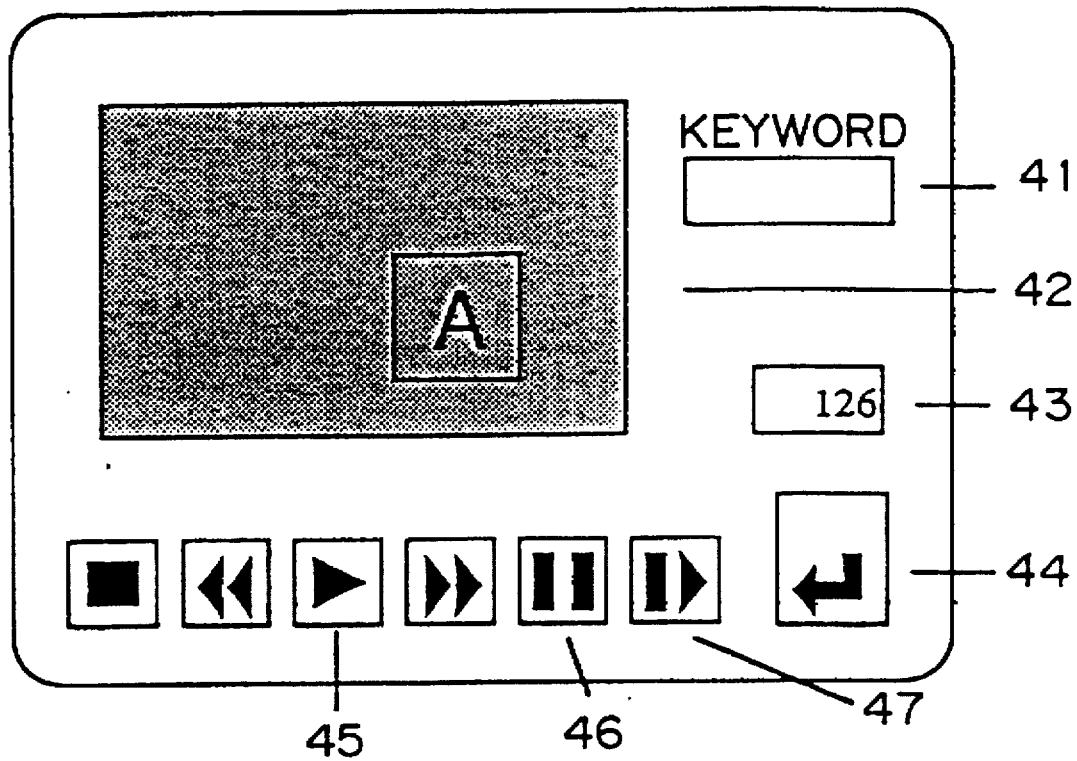
FIG. 10 shows how to set the video view object.

To set a portion of video data, a user selects a plurality of representative frames (first, middle, and last frames) from video data, and selects desired portions from those frames. Specifically, the video data is played by pressing the playback button 45 visible on a GUI screen shown in FIG. 10. Then, the user presses a button 47 to play frame on a screen 42 when reaching near to the frame the user desires to register. When reaching the desired frame, the user presses a pause button 46 to suspend the reproduction. At that time, a frame number appears in a frame number display window 43. In the paused frame, the user selects the desired portion A for registration (by dragging a mouse or by marking with a tablet), and presses a button 44 for setting the portion of data. The user should repeat this operation until all of the desired portion of the frames are registered. Also, the user should input a keyword (via a keyboard, or by selecting from a menu where it has been previously registered.) The keyword is displayed in a keyword window 41.

The view object generation part 15 calculates the number of seconds from the beginning of the frame according to a frame number and a frame rate pre-specified in a file header for each of the selected frames. Upper-left and a lower-right coordinates in the selected portions in each frame are read likewise(2). Then, a method "new( )" provided by the system is invoked in a video view class using the number of seconds obtained, a set of coordinate combinations, a file name and the above keyword as arguments so that the view object can be generated. Assuming that frames from t1 through tn are selected, an upper-left coordinate and a lower-right coordinate in a selected portion in the t1 frame are respectively (x11, y11) and (x12, y12), an upper-left coordinate and a lower-right coordinate in a selected portion in the t2 frame are respectively (x21, y21), and (x22, y22), . . . , a video view object shown in FIG. 8 is generated.

For video voice data, the portion from t1 to tn is set as a portion corresponding to the frame (image) data.

Figure 11:
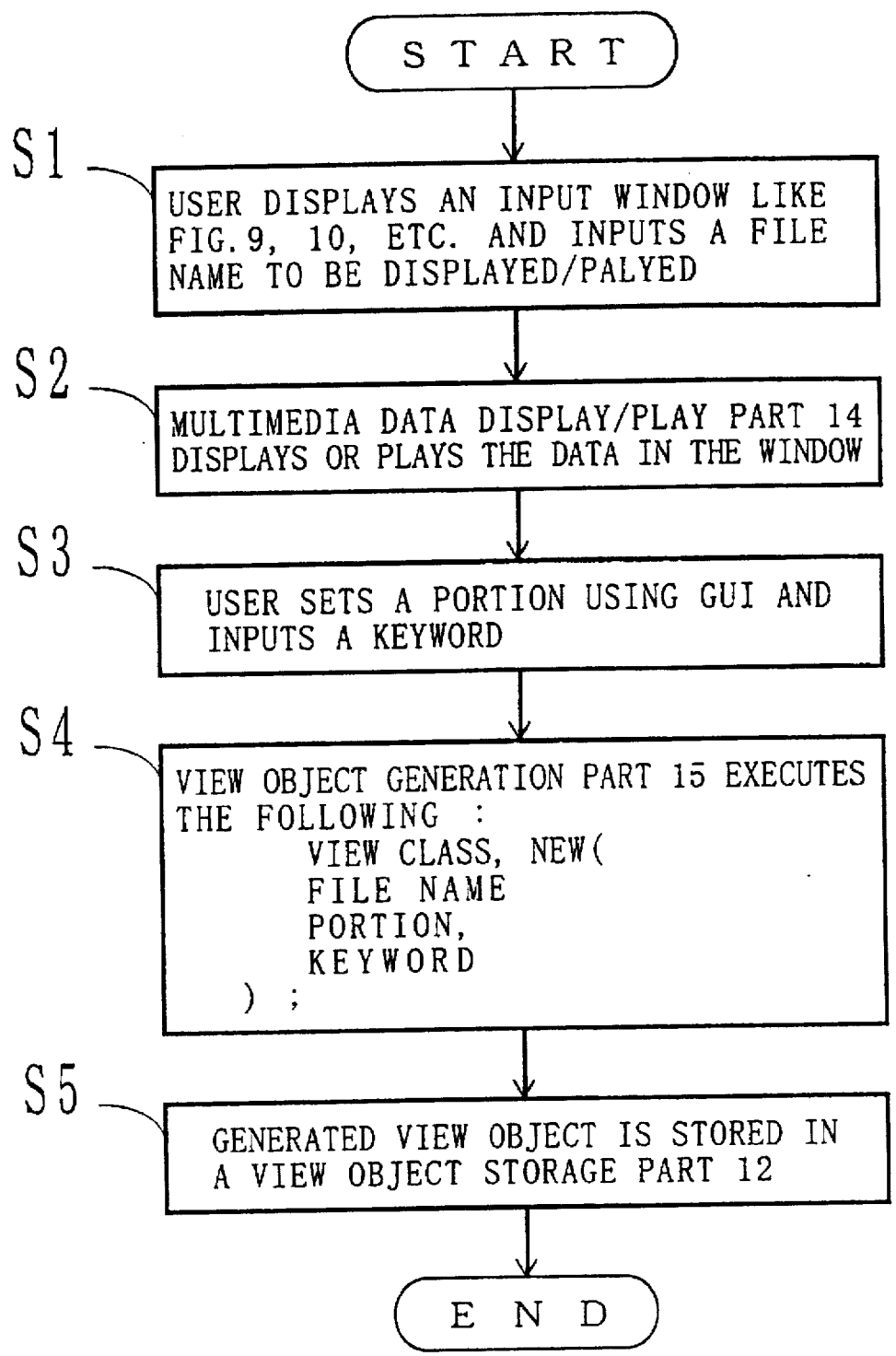
FIG. 11 shows a flowchart for generating the view object.

Next, a general description of generating a view object is given below. FIG. 11 shows a flowchart for generating a view object. Once the process starts in this figure, a user specifies a file name that stores multimedia data to be displayed and played in an input window shown in FIGS. 9 or 10 in Step S1. Next, the multimedia data display/reproduction part 14 displays/plays the specified file in a window in Step S2. In Step S3, the user sets a portion of data corresponding to a view object by means of a GUI (Graphic User Interface), and inputs a keyword. According to the input, the view object generation part 15 executes a method "new( )" in a view class of that medium to generate a view object that has a file name, a set portion, and a set of keyword as attribute values in Step S4. The generated view object is stored in the view object storage part 12 in Step S5 and the process is terminated.

Next, a search performed for view objects stored in the view object storage part 12 is explained below.

Figure 12:
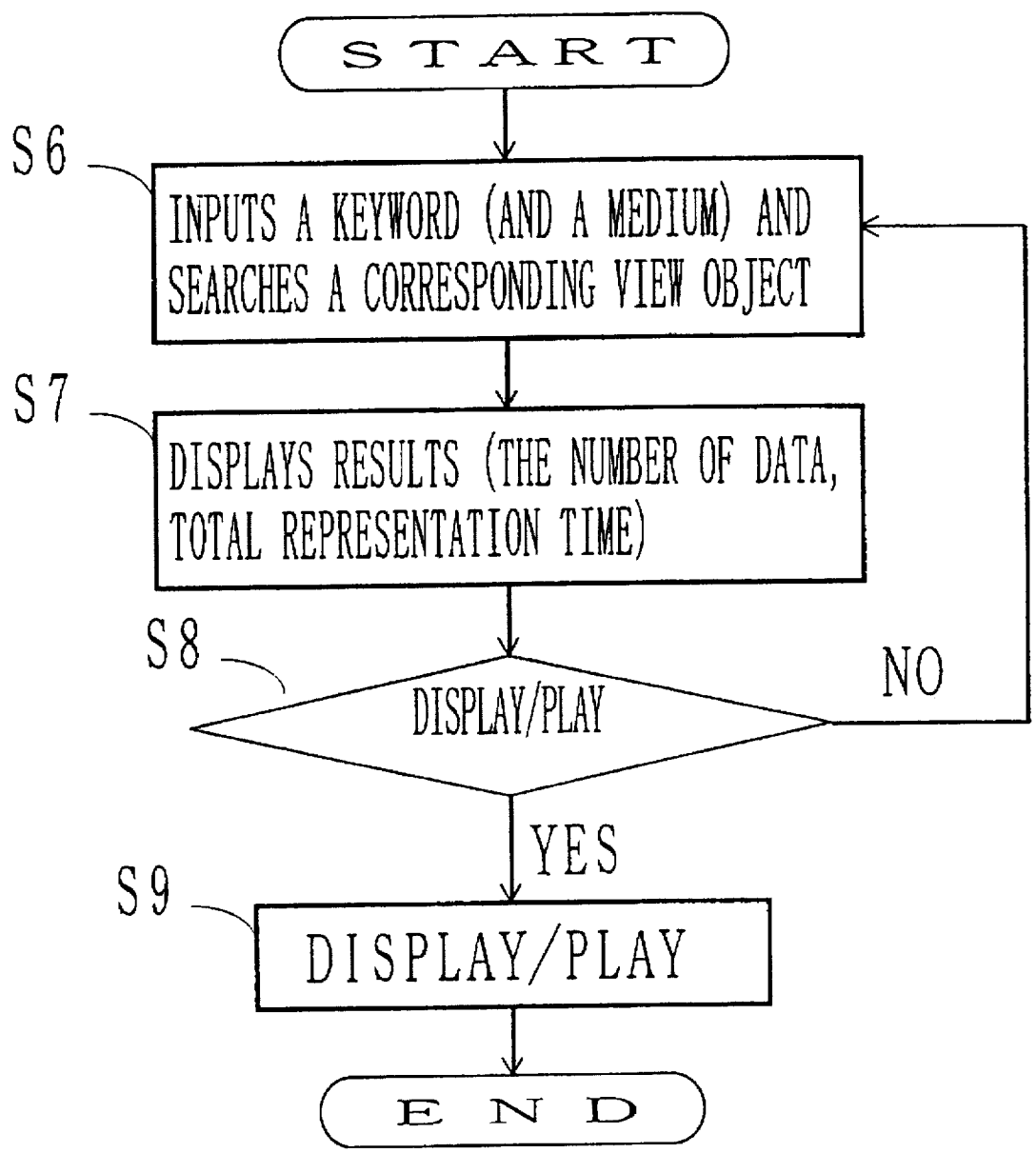
FIG. 12 shows a flowchart for searching and displaying multimedia data.

FIG. 12 shows a flowchart for searching a view object. Once the process starts in this figure, the view object management part 13 searches for a corresponding view object depending on a specified keyword in Step S6. The keyword is inputted, for example, via a keyboard or by selecting from a menu where it has been previously registered by the user.

Then, search results are displayed in Step S7. The view object management part 13 also controls the display of search results. As the search results, for example, the numbers of searches performed for each medium such as a video medium, an audio medium, an image medium, and a text medium are displayed as shown in FIG. 13, and total representation time are displayed for both a video view object and an audio view object. For the audio view object, the result of t2−t1 as a portion shown in FIG. 7 is also displayed as one of the search results. While for the video view object, the result of tn-t1 is displayed as one of the search results.

When the search results are displayed, the user decides whether to continue a search or whether to display the resultant view objects in Step S8. If the user decides to continue the search, the process goes back to S6. If the user decides to display a portion of data corresponding to the view object, the method "display( )" or "play( )" is invoked by each of view objects searched by the multimedia data display/reproduction part 14 to represent data in a way corresponding to each of view objects in Step S9. The process is then terminated.

Figure 14:
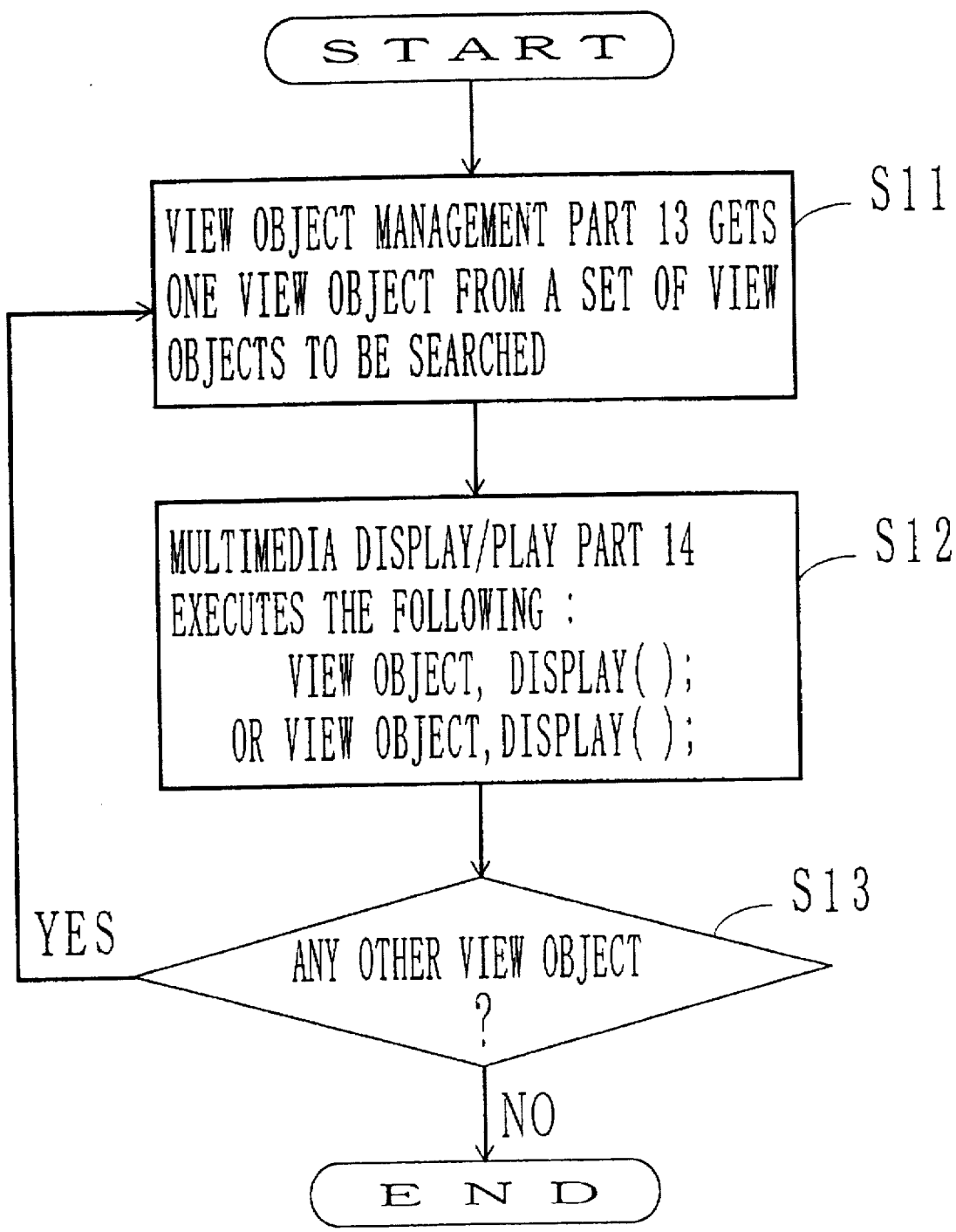
FIG. 14 shows a flowchart for representing the portion of data corresponding to a view object.

FIG. 14 shows a flowchart for displaying a portion of data corresponding to a view object. Once the process starts in this figure, the view object management part 13 gets one of view objects from a set of view objects to be displayed in Step S11. In Step S12, the multimedia data display/reproduction part 14 executes the method "display( )" or "play( )" in the view object. Then, whether or not there is any other view object to be displayed is determined in Step S13. If the result is YES, the process goes back to Step S11. Otherwise, the process is terminated.

FIG. 14 is a display process of Step S9 in FIG. 12, performed as an operation by the system side. While FIG. 12 is a process of searching and representing data performed as a method used by the user side. The representing process and the search/representing process are performed in a similar fashion, but the search/represent process may sometimes perform a represent without performing a search.

Next, details of how to display and play a portion of data are specifically provided below.

(1) First embodiment of displaying a portion of text data

For a display of a portion of text data, a portion specified by a view object is displayed. For example, in the text view object shown in FIG. 5, "a" bytes are searched from the beginning of a file. Then, a portion of "(b-a)" bytes is read from the file to be displayed.

(2) First embodiment of displaying a portion of image data

In this embodiment, a portion specified by a view object is rescaled by an integer multiple to be visible in a window. For example, the size of a portion of image data is (x2-x1, y2-y1) for the image view object shown in FIG. 6. According to this size and a window size, a maximum integer multiple n that can be displayed in a window is calculated. The data ranging from (x1,y1) to (x2,y2) is multiplied by n in the X and Y axes to be displayed.

(3) Second embodiment of displaying a portion of image data

In this embodiment, a portion specified by a view object is made to be a little larger than the originally-specified size, and is rescaled by an integer multiple to be visible in a window. By way of example, assuming that the image view object shown in FIG. 6 is cut with an extra size of Δ, and the size of the total image data is xm X ym:

$$xs=\max(0,x1-\Delta), ys=\max(0,y1-\Delta),$$

$$xe=\min(xm,x2+\Delta), ye=\min(ym,y2+\Delta),$$

are obtained and a range of (xs,ys)–(xe,ye) is enlarged and displayed similar to the first embodiment of displaying a portion of image data.

(4) Third embodiment of displaying a portion of image data

In this embodiment, a portion specified with by view object is rescaled by an integer multiple to be visible in the center of a window. While, the unspecified portion of the data is made rougher to be shrunk and displayed in the rest of the window. For example, an enlargement ratio is obtained for the image view object shown in FIG. 6, in the same manner as the first embodiment of displaying a portion of image data. Assuming that the window size is wx×wy:

$$xa=(wx-n(x2-x1))/2, xb=(wx+n(x2-x1))/2$$

$$ya=(wy-n(y2-y1))/2, yb=(wy+n(y2-y1))/2$$

are obtained.

Data in a range of (x1,y1)–(x2,y2) is enlarged and displayed in a range of (xa,ya)–(xb,yb) similar to the first embodiment of displaying a portion of image data.

Data in a range of (0,0)–(x1,y1) is displayed in a range of (0,0)–(xa,ya) ;

Data in a range of (x1,0)–(x2,y1) is displayed in a range of (xa,0)–(xb,ya);

and data in a range of (x2,y2)–(wx,wy) is displayed in a range of (xb,yb)–(wx,wy) by being reduced.

Assuming m pieces of data are displayed by reducing to k pieces of data in the X-axis, the following is used:

if(m-k>k) {data is displayed every [m/k]} else {data is displayed by skipping data every [m/m-k]}.

The same is done in the Y-axis. The [m/k]herein indicates a maximum integer number which is equal to or less than an m/k. (The same will apply hereafter.)

Even if data specified similar to the first embodiment of displaying a portion of image data, is rescaled by an n multiple to be visible on a screen, the rescaled data does not appear as a full screen. This is because n is an integer. If it happens to appear as a full screen, n should be changed to n−1 in order to leave some screen space to display shrunk data. If n equals 1, it should be left unchanged. That is, n is determined as follows:

$$n=\min([wx/x2-x1], [wy/y2-y1]);$$

$$if(n\neq 1 \text{ and } (wx=n(x2-x1) \text{ or } wy=n(y2-y1))n=n-1$$

(5) First embodiment of reproducing a portion of audio data

In this embodiment, a range specified by a view object is played. The audio view object shown in FIG. 7, for example, is play for a period of (t2−t1) seconds starting from time t1 second.

(6) Second embodiment of reproducing a portion of audio data

In this embodiment, not only the range of data specified by a view object, but data for a pre-specified period before and after that data is played. For example, assuming that data of an extra period of a time delta before and after the selected portion data is played for the audio view object shown in FIG. 7, and a time to play the entire data is tm:

$$ts=\max(0, t1-\Delta), te=\min(tm,t2+\Delta)$$

is obtained to play data during (te−ts) seconds starting from a time ts.

(7) Third embodiment of reproducing a portion of audio data

In this embodiment, the portion of data specified by a view object is played at a normal speed. Data in the unspecified range is fast-forwarded at a pre-specified speed and played. For reproduction at an n-times speed, voice data converted into PCM data is played every n to skip the data.

For the audio view object shown in FIG. 7, assuming that the total time to play the entire data at n-times speed is tm:

fast forward for a t1/n seconds starting from time 0 reproduction at a normal speed for (t2−t1) seconds starting from time t1 fast-forward reproduction for (t1−t2)/n seconds starting from time t2

The sound reproduction is performed as described above.

When a plurality of view objects are searched, they are sorted in the order of a start time shown for each portion. If portions are t1−t2 and t3−t4 (t1<t3), for example:

if (t2<t3) (fast forward for a t1/n seconds starting from the time 0 reproduction at a normal speed for a (t2−t1) seconds starting from the time t1 fast forward for(t3-t2)/n second starting from time t2 reproduction at the normal speed for (t4-t3) seconds starting from time t3 fast forward for (tm-t4)/n seconds starting from t4

The entire reproduction is performed as described above.

else

Assuming te=max(t2,t4), fast forward for t1/n seconds starting from time 0 reproduction at a normal speed for (te-t1) seconds starting from time t1 fast forward for (tm-te)/n seconds from time te

The reproduction is performed as described above.

(8) Fourth embodiment of reproducing a portion of audio data

In this embodiment, data in the range specified by a view object is played at a normal speed. While data in the unspecified range is played to be completed within a given time by skipping silent data.

If voice data whose amplitude is equal to or less than a threshold level lasts for a pre-specified duration or longer, it is recognized as being a silent portion. By raising this threshold level in small increments, the entire reproduction can be arranged to be completed within a given time. For the audio view object shown in FIG. 7, for example, assuming that the entire reproduction is specified to be completed within a time T, an increment to raise the threshold level is α, for a pre-specified minimum duration of a silent portion is time tn, and the total reproduction time is tm:

| if (T ≤ t2-t1) | {reproduction for (t2-t1) seconds starting from time t1 |
|---|---|
| else | (A = α<br>*if(a total time of portions where the amplitude is A or less for tn seconds or longer in the ranges 0-t1 and t2-tm > tm-T)<br>{Reproduction of the portion of t2-t1 and the portions of 0-t1 and t2-tm excluding the portions where the amplitude is A or less for tn seconds or longer, and terminates the process.} |
| else | {A = A + α, and the process goes back to *.)} |

If a plurality of audio view objects are searched, unspecified portions are detected in the same manner as the third embodiment of reproducing a portion of audio data. The above algorithm is applied to all of the specified portions for reproduction. If T is less than t2-t1, all of the specified portion without exception is played, even though the reproduction time exceeds the time T. This is because it cannot be played within the time T.

(9) First embodiment of reproducing a portion of video data

In this embodiment, a portion of data marked with a rectangle within a frame described in a view object is rescaled by an integer multiple and displayed in a window. For a frame that is not described in the view object, the marked portion is assumed to linearly move between frames marked with data portions, and is displayed interpolatively. For each specified frame from t1 to tn seconds in the video view object shown in FIG. 8, the data is rescaled and displayed in the same manner as in the first embodiment of reproducing a portion of image data.

For the other frames, such as the ones between time t1 and t2, assuming that a time from t1 to that frame is ti:

$$xs=x11+[(x21-x11)ti/(t2-t1)], ys=y11+[(y21-y11)ti/(t2-t1)],$$

$$xe=x12+[(x22-x12)ti/(t2-t1)], ye=Y12+[(y22-y12)ti/(t2-t1)]$$

are obtained, and data in a range of (xs,ys)-(xe,ye), is enlarged and displayed in the same manner as in the first embodiment of reproducing a portion of video data.

(10) Second embodiment of reproducing a portion of video data

In this embodiment, the data for a portion marked with a rectangle in a frame described in the view object also includes a pre-specified extra space around the selected portion and is rescaled by an integer multiple to be visible in a window. If the video view object shown in FIG. 8 includes extra space of Δ, a marked portion in each frame from t1 to tn seconds is enlarged and displayed for reproduction in the way described in the second embodiment of reproducing a portion of image data. For the other frames, portions to be displayed are determined in the way described in the first embodiment of reproducing a portion of video data. Then they are also enlarged and displayed for reproduction in the way described in the second embodiment of reproducing a portion of image data.

(11) Third embodiment of reproducing a portion of video data

In this embodiment, a portion marked with a rectangle in a frame described in the view object is rescaled by an integer multiple and displayed in the center of a window. Unmarked portions are reduced by skipping data vertically and horizontally, so that they can be shrunk and displayed in the rest of the window.

For each frame from t1 to tn seconds in the video view object shown in FIG. 8, for example, selected portions are enlarged and displayed in the way described in the third embodiment of a portion of image data. Data in the other portions are reduced for reproduction. For the other frames, portions to be displayed are determined in the way described in the first embodiment of reproducing a portion of video data.

After determination, the selected portions are enlarged and displayed in the same manner as in the third embodiment of reproducing a portion of image data. The other portions are reduced so that they can be shrunk and displayed. For voice data in the embodiments 1 to 3 of reproducing a portion of video data, only the portions t1 to tn are played.

Figure 15:
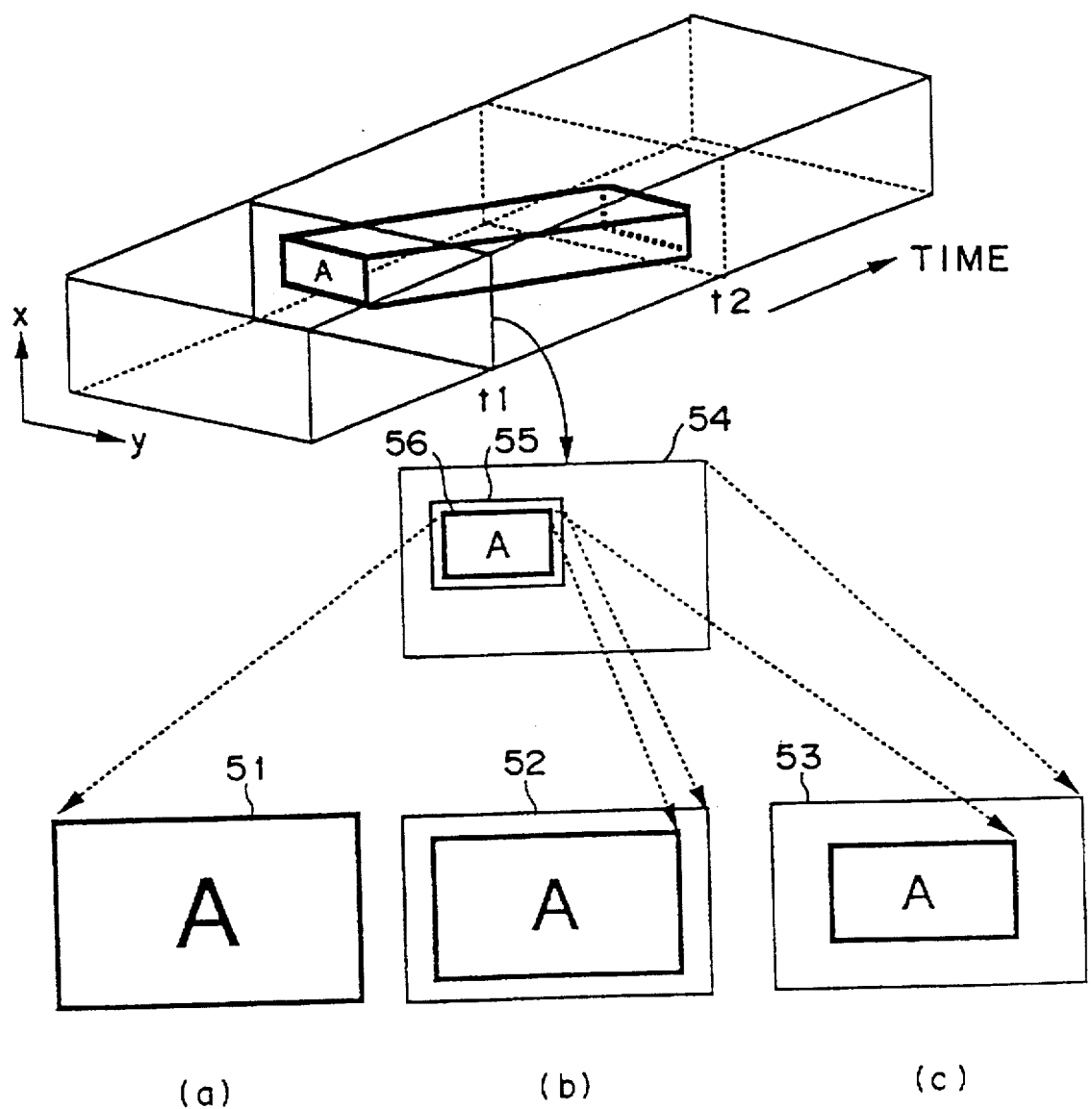
FIG. 15 shows an example of reproducing a a portion of video data.

FIG. 15 shows an embodiment of reproducing a portion of video data. 51 indicates a state that only a portion marked with a rectangle 56 at a time t1 is enlarged and displayed in a window. 52 indicates a display of a portion marked with a rectangle 56 having an extra space of Δ around it 55 at the time t1. 53 indicates a display where reduced portions are displayed in the rest of the window 54 around the portion enlarged and displayed at the time t1.

(12) Fourth embodiment of reproducing a portion of video data

In this embodiment, a portion marked with a rectangle in a frame described in a view object is rescaled by an integer multiple and displayed in a window.

At that time, data for a pre-specified time before and after that portion is retrieved to be played in addition to that portion. For the video view object shown in FIG. 8, for example, frames (seconds) before t1 and after tn to be retrieved are determined in the way described in the second embodiment of reproducing a portion of video data. For those frames, portions to be displayed are determined and played in the way described in the first embodiment of reproducing a portion of video data. It is also possible to change portions to be displayed by combining the method described in the second embodiment of reproducing a portion of video data with the method described in the third embodiment of reproducing a portion of video data. Voice data is played in the same manner as in the second embodiment of reproducing audio data.

(13) Fifth embodiment of reproducing a portion of video data

In this embodiment, a portion marked with a rectangle in a frame described in a view object is rescaled by an integer multiple and displayed. Frames in a range specified by the view object are played at a normal speed, while the frames in an unspecified range are fast-forwarded at a pre-specified speed for reproduction. To perform a fast forward reproduction at an n-times speed, frames are displayed every n to skip data. For the video view object shown in FIG. 8, the duration of time t1–tn is assumed to be the specified portion. Portions to be fast-forwarded and portions to be played at a normal speed are determined and played in the way described in the third embodiment of reproducing a portion of audio data. For the specified frames to be displayed, portions to be displayed are determined and played in the way described in the first embodiment of reproducing a portion of video data. It is also possible to change portions to be displayed by combining the method described in the second embodiment of reproducing a portion of video data with the method described in the third embodiment of playing a portion of video data. The voice data is played in the same manner as in the third embodiment of reproducing a portion of audio data.

(14) Sixth embodiment of reproducing a portion of video data

In this embodiment, a portion marked with is a rectangle in a frame described in a view object rescaled by an integer multiple and displayed in a window. Frames in a range specified in the view object are played at a normal speed, while frames in an unspecified range are fast-forwarded and played to be completed within a given time. Voice data is played to be completed within a given time by skipping data in silent portions. For the video view object shown in FIG. 8, if it is specified for the entire reproduction to be completed within a time T, and assuming the total reproduction time is tm:

```
if (T4 ≦ tn–t1) {Reproduces the portion of
              t1–tn seconds according to the first embodiment
              of reproducing a portion of video data. The range
              t1–tn can be reproduced without even though the
              total reproducing time exceeds T.}
else          {n = [(tm–(tn–t1))/(T–(tn–t1))]
              if (n = 0) {Reproduces a portion of
              time 0–tm according to the first
              embodiment of reproducing a
              portion of video data.}
else          {Reproduces both the portions
              0–t1 and tn–tm at an n + 1-
              times speed, and the portion
              t1–tn at a normal speed
              according to the first
              embodiment of reproducing
              a portion of video data.}}
```

Voice data is played in the same manner as the fourth embodiment of reproducing a portion of audio data. It is also possible to change portions to be displayed by combining the method described in the second embodiment of reproducing a portion of video data with the method described in the third embodiment of playing a portion of video data.

Frames in an unspecified range are fast-forwarded and played within a given time, while voice data is played by skipping data in silent portions. Accordingly, image data and voice data do not always correspond to each other in the ranges not specified in the view object. Since portions to be played that are not specified by the view object are intended to indicate only an association with the specified portions, this does not matter. If the above if-condition is satisfied and the specified time T is shorter than a time (t1–tn) set in the view object, reproduction is performed. That is, all of the portions specified with the view object are played.

If a data length obtained by subtracting a length t1–tn specified in the view object from the whole length of the video data is equal to or more than an n-multiple of a length obtained by subtracting a length of portion (t1–tn) from the specified reproducing time T, and less than an n+1 multiple, the if-condition is not satisfied.

Accordingly, all of the portions excluding the portion (t1–tn) are played at an n+1 times speed to be completed within the specified reproduction time T.

Next, a complex view object generated by combining a plurality of view objects is explained below. FIG. 16 shows an example of a complex view object. The complex view object has a set of a plurality of view objects that are generated depending on a type of medium as an attribute. Each medium has a corresponding set of descriptions of view objects. Further, a keyword is defined for each complex view object, and a method "represent( )" is described so as to represent the complex view object.

Unlike the single view objects shown in FIGS. 5 through 8, the complex view object is an object of a complex view class that has an expanded structure, such as a set of view objects for each medium instead of a file name and a portion. By appending such a complex view class under the View class shown in FIG. 4, the complex view object can be handled. The method "represent( )" in this case is defined to call the method "display( )" or "play( )" as a view object method for each medium, which can display data of various media from the complex view object. The complex view object in this case is recognized as describing a set portion of data. Accordingly, reusing view objects allows data to be edited by a semi-automatic procedure.

Figure 17:
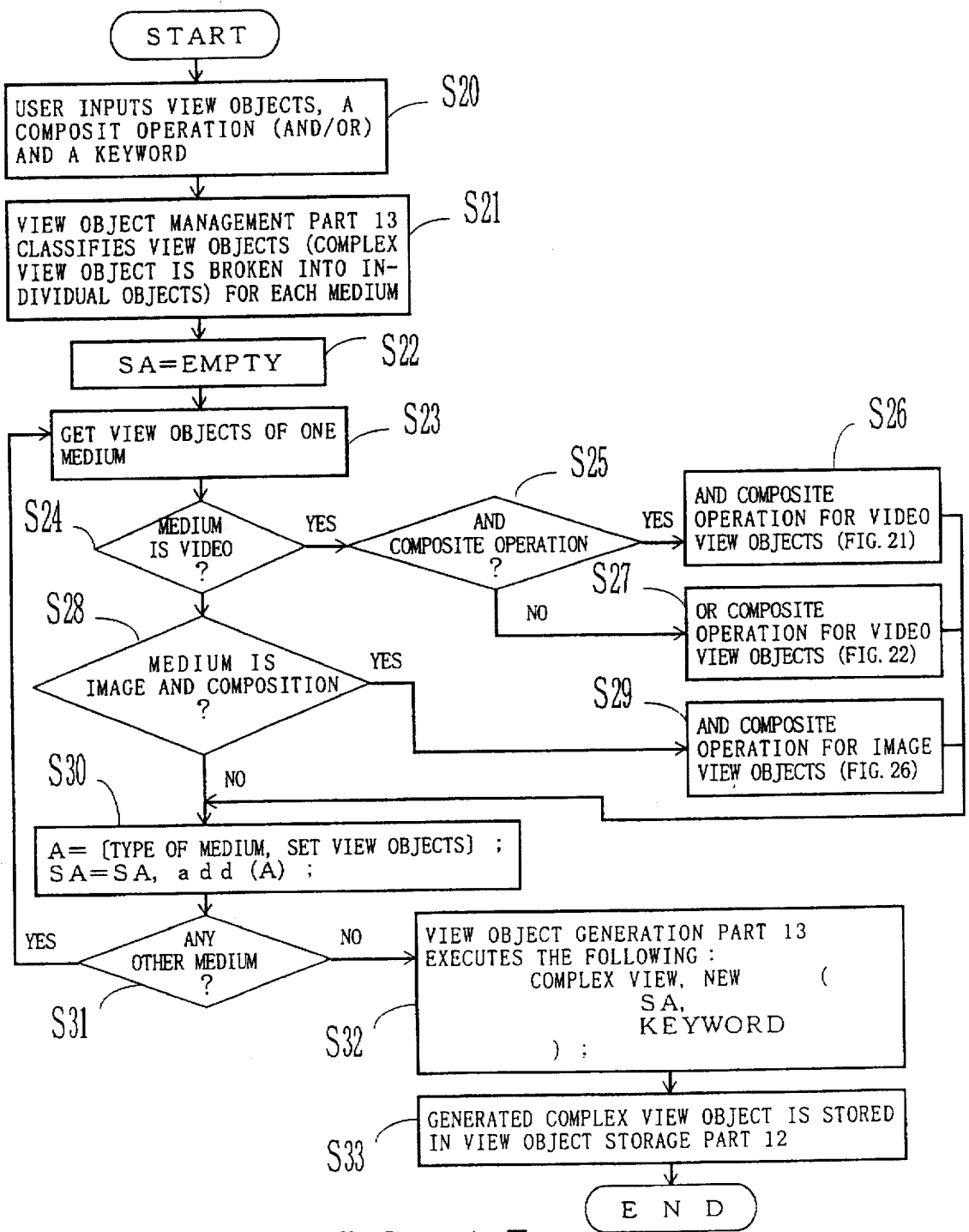
FIG. 17 shows an entire flowchart for generating the complex view object.

FIG. 17 shows a flowchart for generating a complex view object. Once the process starts, a user specifies view objects to be combined and a composite operation (and/or), and inputs a keyword in Step S20. An and composite operation can be only defined between image view objects or between video view objects. Then, a view object management part 13 collects view objects for each medium as a set in Step S21. If view objects to be combined are complex view objects, they are separated into individual view objects and collected for each medium. Then, a set SA that has a set of view objects as an element for each medium is defined as an empty set in Step S22. After these steps are processed, sets of view objects for one medium are got in Step S23. Then, whether or not that medium is a video is determined in Step S24. If it is the video, whether or not a composite operation used is an and operation is determined in Step S25. If it is the and operation, the and composite operation is performed for the video view objects in Step S26. A definition of the and composite operation and its method are described later.

If it is not determined as the and performed for the video view objects in Step S27. A definition of the or composite operation and its method are also described later.

In the meantime, if the medium is not determined as video, whether or not the medium is an image medium and whether or not a composite operation is the and composite operation are determined in Step S28. If the result is YES, the and composite operation is performed for image view objects in Step S29. Why these two types of determination are performed at the same time in Step S28 is that the or composite operation is not applied to image data. The reasons are described later.

If the medium is not video in Step S24, if it is not an image medium or it is not generated by the and composite operation despite being an image in Step S8, if the and composite operation and the or composite operation for the video view objects are each performed in Step S26 or Step 27, and if the and composite operation is performed for image view objects in Step S29, a set of a medium name and a plurality of view objects corresponding to the medium name is defined as A, which is added to the set SA in Step S30. That is, by invoking a method "add(A)" for adding an element to the set SA (provided by the system), the set SA is obtained. Whether or not there is any other medium is determined in Step S31.

If the result is YES, the process goes back to Step S23. If no medium exists, i.e., a process for a set of view objects collected for each medium in Step S21 is terminated, the view object generating part 15 executes a method "new( )" to generate a new complex view object from a complex view object class. Then, the complex view object generated in Step S33 is stored in the view object storage part 12, and the process is terminated.

FIG. 17 shows a flowchart for generating a complex view object. A set SA used in this figure is stored in a temporary storage area that includes sets of view objects for each medium.

By combining them, a new object is generated from a complex view object class. Assuming text view objects are to1 and to2, and image view objects are io1 and io2, for example, a complex view object is generated for the set SA shown below, when generating a view object by combining these view objects.

$$SA=\{[text,\{to1, to2\}], [image, \{io1, io2\}]\}$$

Figure 18:
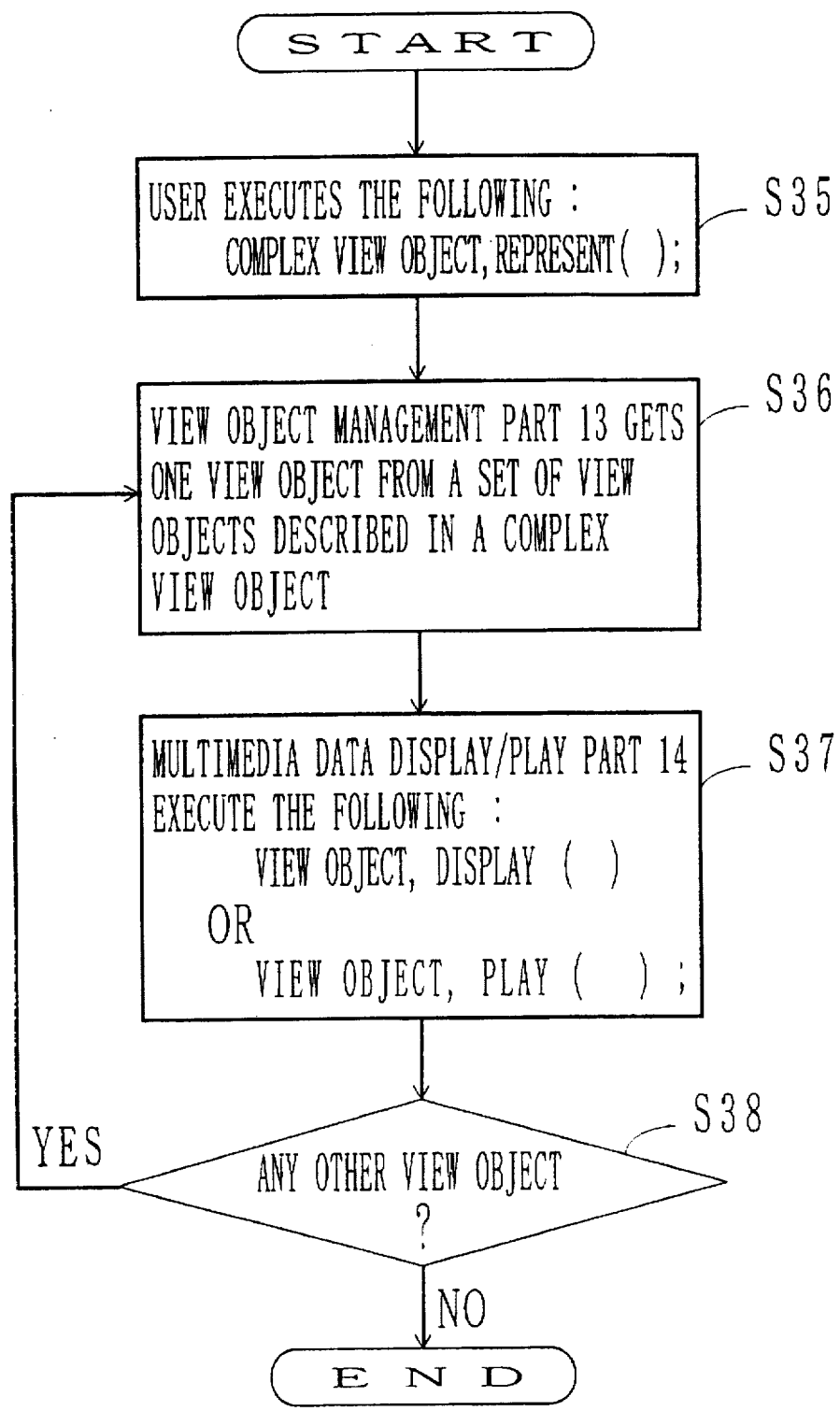
FIG. 18 shows a flowchart for representing the complex view object.

FIG. 18 shows a flowchart for displaying a generated complex view object. Once the process starts in this figure, a user executes a method "represent( )" for the complex view object in Step S35. Then, a view object management part 13 gets one view object from a set of view objects in Step S36. Next, a multimedia data display/reproduction part 14 executes the method "display( )" or "play( )" from the view object. Then, whether or not there is any other view object is determined in Step S38. If the result is YES, the process goes back to Step S36. Otherwise, the process is terminated.

Details of how to perform composite operations shown in Steps S26, S27 and S29 in FIG. 17 when generating a complex view object is provided below using an embodiment.

Figure 19:
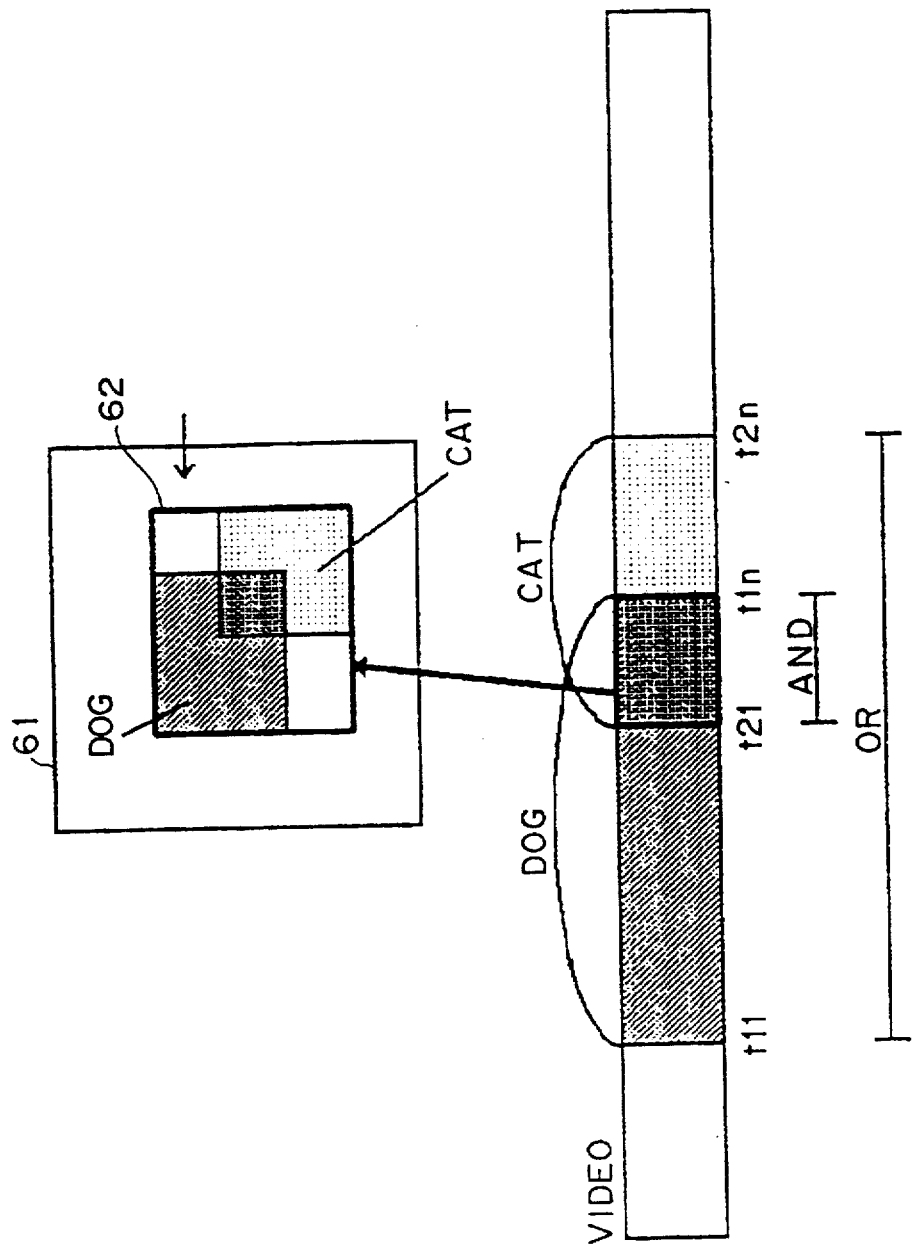
FIG. 19 shows how to make composite video data.

FIG. 19 shows how to make composite video data. First of all, explanations on and composite and or composite operations are provided referring to this figure.

As shown in this figure, a dog is visible in frames in a period from time t21 till time t1n. In addition, a cat is visible in frames in a period from time t21 till time t2n. The time t21 starts before the time t1n.

The and composite operation for video data is a process primarily performed in a period that the dog and the cat are simultaneously visible in one frame, i.e. the period from the time t21 to the time t1n. In this period, a portion including display areas where both the dog and the cat are visible is defined as a resultant portion of an and composite operation. The area including display areas for both the dog and the cat in a representative frame 61, the area that includes the visible dog and cat, i.e. the big square surrounded by a thick black line 62, is defined as a portion 62. The set portion 62 is herein called "dog and cat".

Unlike FIG. 19, if the time t21 is after the time t1n, i.e. if there is no period where the dog and the cat are simultaneously visible in one frame, no common portion is recognized and no set portion is generated as a result of the and composite operation.

For the or composite operation of the video data, a portion where either of the dog and the cat or both of them are visible, is recognized as a set area. In the period from t11 to t21 in FIG. 19, a range where the dog is visible is recognized as a portion. In the period from t1n till t2n, a range where the cat is visible is recognized as a portion. In the period from t21 till t1n, a result of the or composite operation is the same as that of the above and composite operation, and a large square 62 for the above "dog and cat" shown in the upper part of FIG. 19 is recognized as a set area.

For the and composite operation of video data, if no common period exists between two set portions to be combined, no common portion is recognized and no set portion is generated as a result of the composite operation. While for the or composite operation, if no common period does not exist between portions to be combined, these portions are generated as a result of the composite operation. If common period exists between two portions, as for the common period, the area include two portions for each frame is recognized as a result of the and composite or the or composite operation.

In the meantime, in the and composite operation for image data, a large square 62 including the "dog and cat" as a result of the and composite operation is recognized as a portion, as shown in the upper part of FIG. 19. That is, the area that includes the two set portions is recognized as a set area. On the other hand for the or composite operation of image data, either the dog or the cat is required to be visible. That is, one of the dog, the cat, and a combination of the dog and the cat, that is visible, is available for the or composition. Since they are not recognized as one body, the or composite operation is not applied to the image data. If both the dog and the cat are visible in one image, view objects are not combined and each portion is played individually.

Further explanation on how to generate a complex view object is given below in (1) through (3), referring to an embodiment shown in FIG. 19.

(1) Making composite image data

For the and composite operation for identical image data, assuming that a rectangle (x1,y1)–(x2,y2) and a rectangle (x3,y3)–(x4,y4) are combined:

$$xs=min(x1,x3), ys=min(y1,y3), xe=max(x2,x4), ye=max(y2,y4)(xs, ys)-(xe,ye)$$

The above equations are obtained and a portion (xs,ys)–(xe,ye) is recognized as a portion.

(2) First embodiment of making composite video data

For an and composite operation for portions of identical video data, and assuming to perform the and composite operation of a portion A in representative frames (t11, t12, . . . , t1i, . . . , t1n) and a set portion B (t11<t21) in representative frames (t21, t22, . . . , t2i, . . . t2m)(t11<t21):

| | |
|---|---|
| if (t1n <= t21) | {There are no common portions.} |
| else | {te = min (t1n,t2m) |
| | 1. Calculates a portion A within the frame in the time t2i (t2i <= te) in the same way as in the first embodiment of a portion of video data. |
| | 2. Calculates a portion B within |

```
       the frame in a time tli
       (t21 <= tli <= te), in the
       same manner as No. 1.
    3. According to representative
       frames of A and B in a period
       t21-te and the frames
       obtained in Nos. 1 and
       2, common portions are
       calculated to be
       representative frames using
       the method described in the
       image composite operation.
```

(3) Second embodiment of making composite video data

For or composite operation for set portion in an identical video data, if combining a portion A in representative frames (t11, t12, . . . tli, . . . tln) with a portion B in representatives frames (t21, t22, . . . t2i, . . . t2m), for example:

```
if(tln < t21) {original video view object}
else if (t2m < t1n)
              {combines the common representative
              frames calculated in the way
              described in the second embodiment
              with the representative frames of
              tli < t21 and tli > t2m in the set portion
              A as representative frames.}
else          {Combines the common representative
              frames calculated in the way
              described in the second embodiment of
              composite video data with the
              representative frames of tli < t21
              and t2i > tln in the portion A as
              representative frames.}
```

Figure 20:
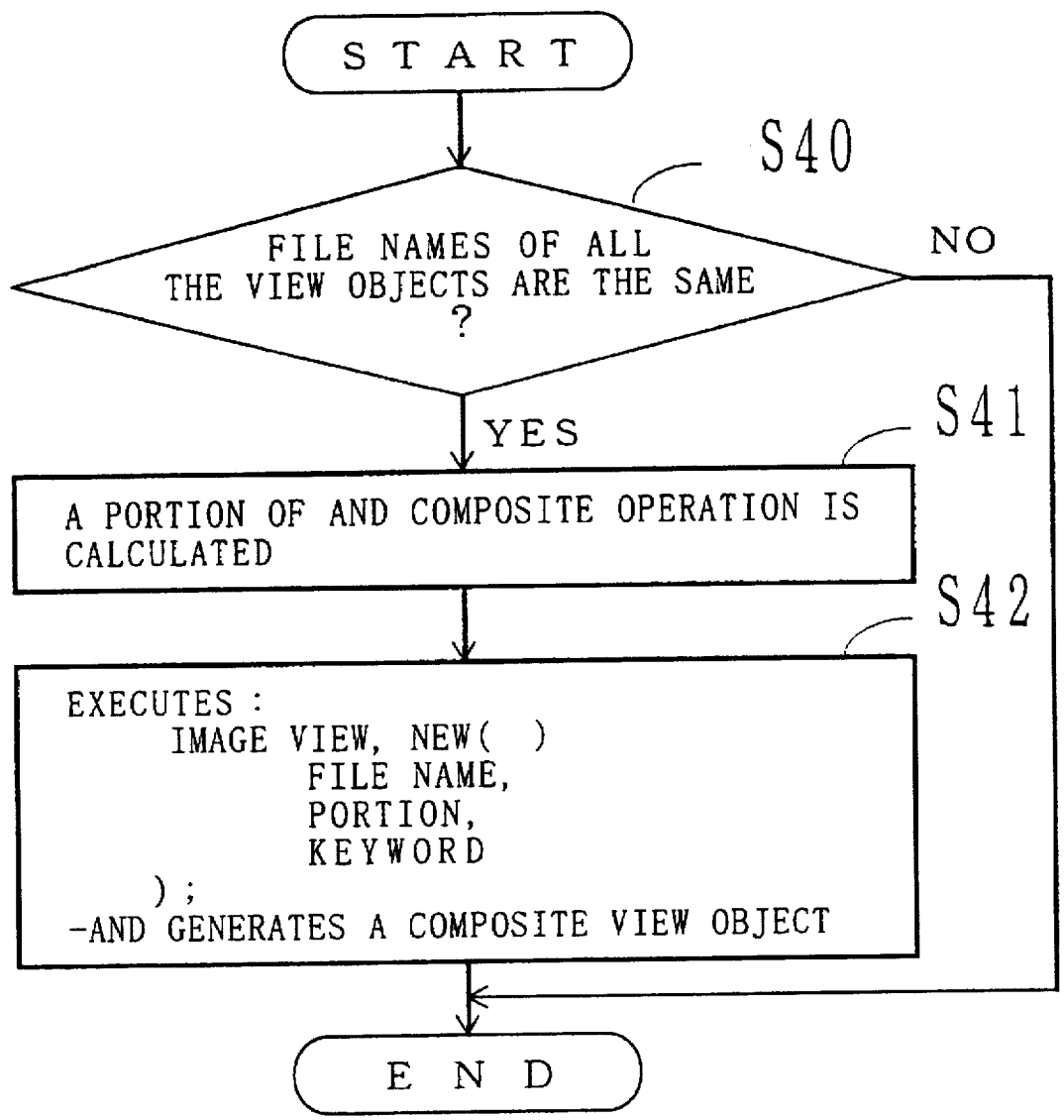
FIG. 20 shows a flowchart for performing an and composite operation for image view objects.

Next, the detailed flowchart for data composite operations performed in Steps S26, S27, and S29 in FIG. 17 is described below. FIG. 20 shows a detailed flowchart for an and composite operation for image view objects. Once the process starts in this figure, it is determined whether or not all of the file names of the view objects, i.e. each of the file names described in view objects included in the set of view objects in Step S23 shown in FIG. 17, are the same in Step S40.

If they are different, the composite process is terminated since it is determined as impossible. If they are the same, portions obtained after the composite operation are calculated from the portion of each view object as described above. Then, a generation method "new( )" is invoked in Step S42 to generate a composite view object, and the process is terminated. Note that this process is executed by the view object management part 13 shown in FIG. 2.

Figure 21:
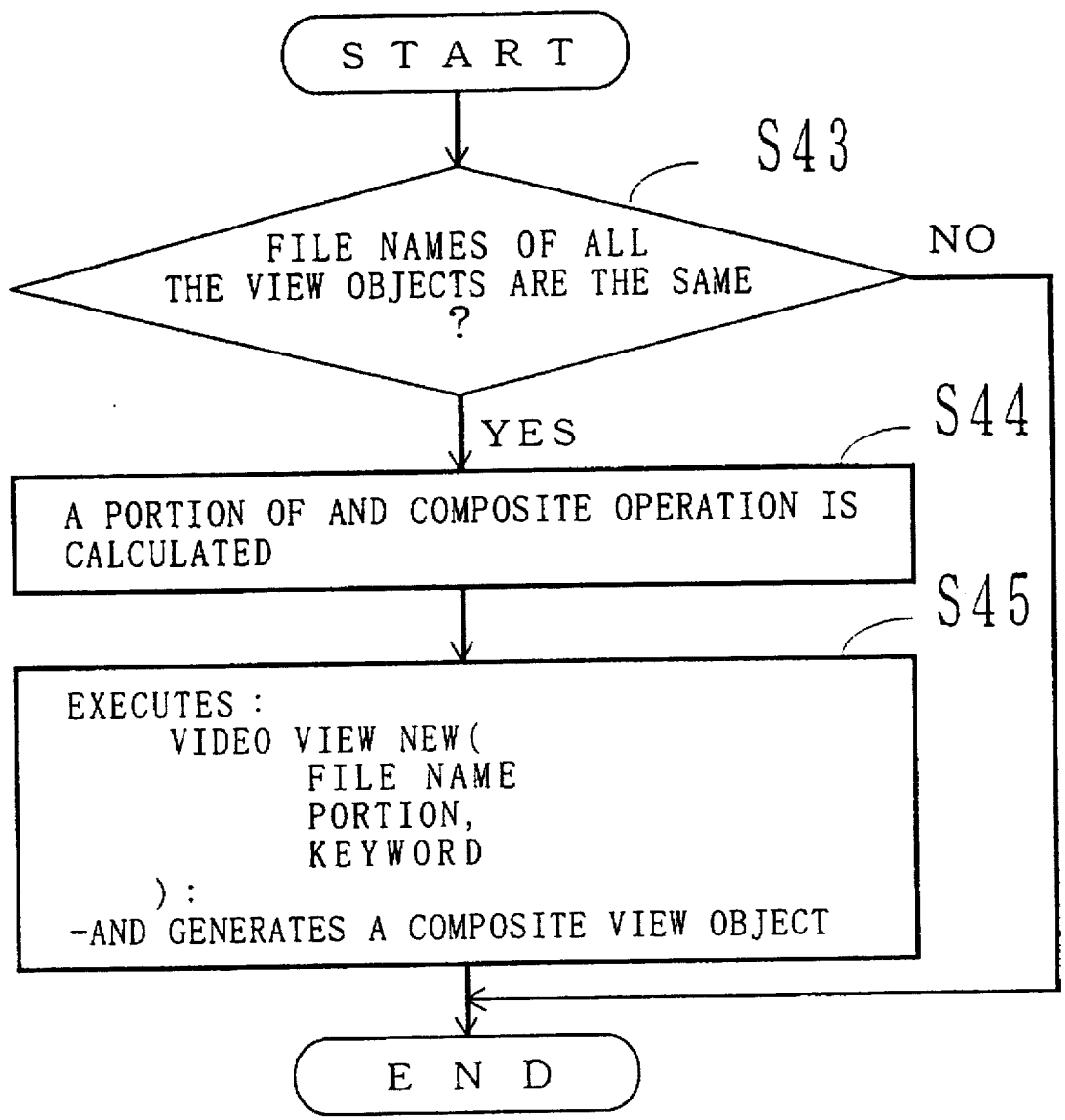
FIG. 21 shows a flowchart for performing an and composite operation for video view objects.

FIG. 21 shows a detailed flowchart of the and composite operation for video view objects, i.e. the operation performed in Step S26. Compared with the image view object shown in FIG. 20, there is a difference that the method "new( )" is invoked for generating a new object from a video view object.

An execution part of this procedure is similar to that of FIG. 20.

Figure 22:
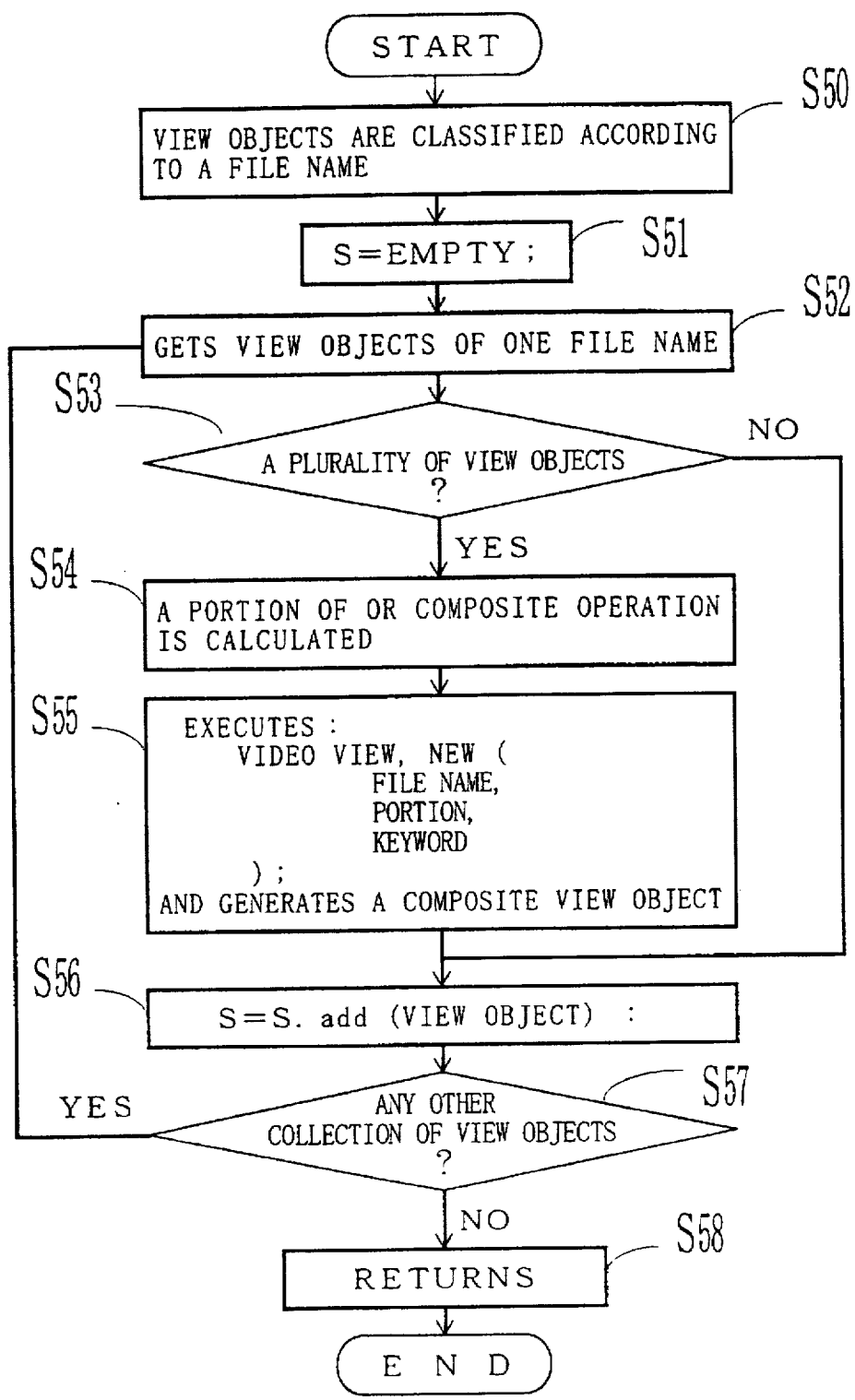
FIG. 22 shows a flowchart for performing an or composite operation for video view objects.

FIG. 22 is a detailed flowchart of an or composite operation for video view objects. Once the process starts in this figure, view objects are grouped depending on a file name in Step S50. S indicating a set of view objects is determined as an empty set in Step S51.

Then, the process performed in Steps S52 through S57 is repeated for each file. First, a set of the view objects corresponding to one file name is retrieved in Step S52.

Whether or not the number of the view objects included in the set is a plurality is determined in Step S53. If it is a plurality, a portion is calculated from set portions in the view objects as described above in Step 54. The method "new( )" is invoked in a class of video view object to generate a composite view object in Step S55.

After the process performed in Step S55, or when the view object is not determined as a plurality in Step S53, the video view object is added to the set S using the method "add" for adding video view objects to the set S in Step S56. Then, whether or not there is any other set of video view objects is determined in Step S57. If the result is YES, the process goes back to Step S52.

If there is no other set in Step S57, i.e. the process for a set of video view objects for all the files is terminated, the contents of the set S is recognized as a result of the or composite operation for video view objects, and the process is terminated. This procedure is also executed by the view object management part 13.

The set S as a result of the or composite operation performed in Step S58 is one view object corresponding to the time t11–t2n in the embodiment shown in FIG. 19.

As described above, set portions are different depending on a period of time even in this period. View objects in sequential periods are combined into one view object. If view objects in non-sequential periods, such as the one included in another file of video, or the one included in non-sequential portions of video, they are grouped as the set S that is a set of non-sequential view objects.

As described above, the embodiments are described assuming video view objects, audio view objects, text view objects, image view objects, and complex view objects exist under the class View as shown in FIG. 4. When different view data is added, a new class is generated under the class View. An attribute of the new class may be the same that of another view object. Or, a unique attribute may be used, and the method "display( )", "play", etc. should include a procedure for displaying/playing the data.

What is claimed is:

1. A multimedia data search system for searching data from a multimedia data base including multimedia data, comprising:

view object storage means for storing view objects describing features of a portion of data cut from sequential data by specifying a time period or a range of space, and data for identifying the portion of data;

view object management means for searching view objects stored in said view object storage means depending on a specification of said features of the portion of data; and multimedia data display/reproduction means for displaying and reproducing the portion of data corresponding to the view object searched by said view object management means, and multimedia data including the portion of data.

2. The multimedia data search system according to claim 1, further comprising:

view object generation means for generating a new view object in response to a request from a user of the system to generate a new view object, and storing it in said view object storage means.

3. The multimedia data search system according to claim 2, wherein said view object generation means generates a text view object corresponding to the portion of data specified by a user on a text screen visible on a display unit.

4. The multimedia data search system according to claim 2, wherein said view object generation means generates an image view object corresponding to the portion of data specified by a user on an image screen on a display unit.

5. The multimedia data search system according to claim 2, wherein said view object generation means generates an audio view object corresponding to the portion of data specified by a user for played sound data over a speaker.

6. The multimedia data search system according to claim 2, wherein said view object generation means generates a video view object corresponding to the portion of data specified by a user in a plurality of representative frames selected by the user on a played video screen visible on a display unit.

7. The multimedia data search system according to claim 2, wherein said view object generation means generates a complex view object by combining a plurality of view objects.

8. The multimedia data search system according to claim 7, wherein said view object generation means generates the complex view object corresponding to a plurality of image data, or a plurality of video view objects corresponding to a portion of video data.

9. The multimedia data search system according to claim 7, wherein when displaying and reproducing the complex view object, said multimedia data display/reproduction means displays and plays portions of data corresponding to a plurality of view objects.

10. The multimedia data search system according to claim 1, wherein when displaying image data corresponding to a view object searched by said view object management means, said multimedia data display/reproduction means displays the portion of data with an extra portion of data of pre-specified size around it, in addition to the portion of data identified by the view object.

11. The multimedia data search system according to claim 1, wherein when displaying image data corresponding to a view object searched by said view object management means, said multimedia data display/reproduction means enlarges for display a portion of data identified by the view object in the center of a screen of the display unit, and shrinks non-identified data to be displayed in a rest of the screen.

12. The multimedia data search system according to claim 1, wherein when reproducing audio data corresponding to the view object searched by said view object management means, said multimedia data display/reproduction means displays extra data as pre-specified before and after a portion of data identified by the view object, in addition to the said portion of data.

13. The multimedia data search system according to claim 1, wherein when reproducing audio data corresponding to the view object searched by said view object management means, said view object display/reproduction means plays a portion of data identified by the view object at a normal speed, and fast-forwards to play non-identified data at a prespecified speed.

14. The multimedia data search system according to claim 1, wherein when reproducing audio data corresponding to the view object searched by said view object management means, said multimedia data display/reproduction means plays a portion of data identified by said view object at a normal speed, or plays non-identified portions excluding data in silent portions for completion within a given time.

15. The multimedia data search system according to claim 1, wherein when reproducing video data corresponding to the view object searched by said view object management means, said multimedia data display/reproduction means plays a portion of data identified in a representative frame specified with the view object, and plays intermediate frames using linear interpolation from the portion of data identified in representative frames, before and after the intermediate frames.

16. The multimedia data search system according to claim 15, wherein said multimedia data display/reproduction means adds and plays extra data as pre-specified around a portion of data in the representative frame, and a portion interpolated in the intermediate frame.

17. The multimedia data search system according to claim 15, wherein said multimedia data display/reproduction means enlarges a portion of data in the representative frame, and a portion interpolated in the intermediate frame to display it in the center of a display unit, and shrinks data in the portions excluding the portion of data in the representative frame and the interpolated portion in the intermediate frame, for displaying it on a rest of the screen of the display unit.

18. The multimedia data search system according to claim 15, wherein said multimedia data display/reproduction means plays video data for determined a pre-specified time longer than a time period determined by the first and last timings of said representative frame.

19. The multimedia data search system according to claim 15, wherein said multimedia data display/reproduction means plays video data in a time period determined by the first and last timings of the representative frame at a normal speed, and fast-forwards video data in time periods excluding the time period determined by the first and last timings of the representative frame, at a pre-specified speed.

20. The multimedia data search system according to claim 15, wherein said multimedia data display/reproduction means plays video data in periods determined by the first and the last timings in the representative frame at a normal speed, and plays in silent portions for the periods excluding the determined periods, for completion within a given time.

21. A multimedia database system, comprising:
  multimedia data storage means for storing multimedia data;
  view object storage means for storing view objects specifying a portion of multimedia data;
  multimedia data search means for retrieving data specified with the view object from said multimedia data storage means; and
  multimedia data display means for displaying data retrieved by said multimedia data search means.

22. The multimedia database system according to claim 21, further comprising:
  view object combining means for combining a plurality of view objects as one complex view object if the number of the view objects is two or more, and stores the complex view object in said view object storage means.

23. The multimedia database system according to claim 22, wherein when a time period of the first data specified with the first view object duplicates that of the second data specified with the second view object, said view object combining means generates the third view object specifying the third data including both the first data and the second data, and stores it in said view object storage means.

24. A view object storage medium for storing features of a portion of multimedia data selected by specifying a time period or a range of space, and a view object that describes data for identifying the portion of data as an object oriented database.

* * * * *